(No Model.)

F. H. RICHARDS.
WEIGHING MACHINE.

No. 606,243.

7 Sheets—Sheet 1.

Patented June 28, 1898.

Witnesses
R. W. Pittman
C. I. Reed

Inventor
F. H. Richards (No Model.) 7 Sheets—Sheet 3.

F. H. RICHARDS.
WEIGHING MACHINE.

No. 606,243. Patented June 28, 1898.

Witnesses.
R. W. Pittman
C. J. Reed

Inventor
F. H. Richards (No Model.) 7 Sheets—Sheet 5.

F. H. RICHARDS.
WEIGHING MACHINE.

No. 606,243. Patented June 28, 1898.

Witnesses.
R W Pittman
C H Reed

Inventor.
F H Richards (No Model.) 7 Sheets—Sheet 6.

F. H. RICHARDS.
WEIGHING MACHINE.

No. 606,243. Patented June 28, 1898.

Witnesses.
R. W. Pittman
C. H. Heed

Inventor.
F. H. Richards (No Model.)  
F. H. RICHARDS.  
WEIGHING MACHINE.  
No. 606,243.  
7 Sheets—Sheet 7.  
Patented June 28, 1898.

Witnesses.  
Inventor.

UNITED STATES PATENT OFFICE.

FRANCIS H. RICHARDS, OF HARTFORD, CONNECTICUT.

WEIGHING-MACHINE.

SPECIFICATION forming part of Letters Patent No. 606,243, dated June 28, 1898.

Application filed July 16, 1897. Serial No. 644,838. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines, more particularly to that class thereof designated as "rising-poise" weighing-machines, in which an overload is reduced instead of an underload increased, thereby to secure a true load, the object of the invention being to provide a plurality of weighing apparatuses so coacting one with another that the material or stream discharged from the load-receiver of one apparatus during the load-reducing period thereof will be received by and constitute a part of the load in the load-receiver of another apparatus without the use of reconveying means for the purpose of conveying such discharged material back to the material-supply means.

A further object of the invention is to provide a duplex weighing-machine in which a part of the operative mechanisms of one apparatus will be reciprocally effective with a part of the operative mechanisms of the other apparatus, whereby the operation of a part of each weighing-machine is controlled by the other machine.

Figure 1:
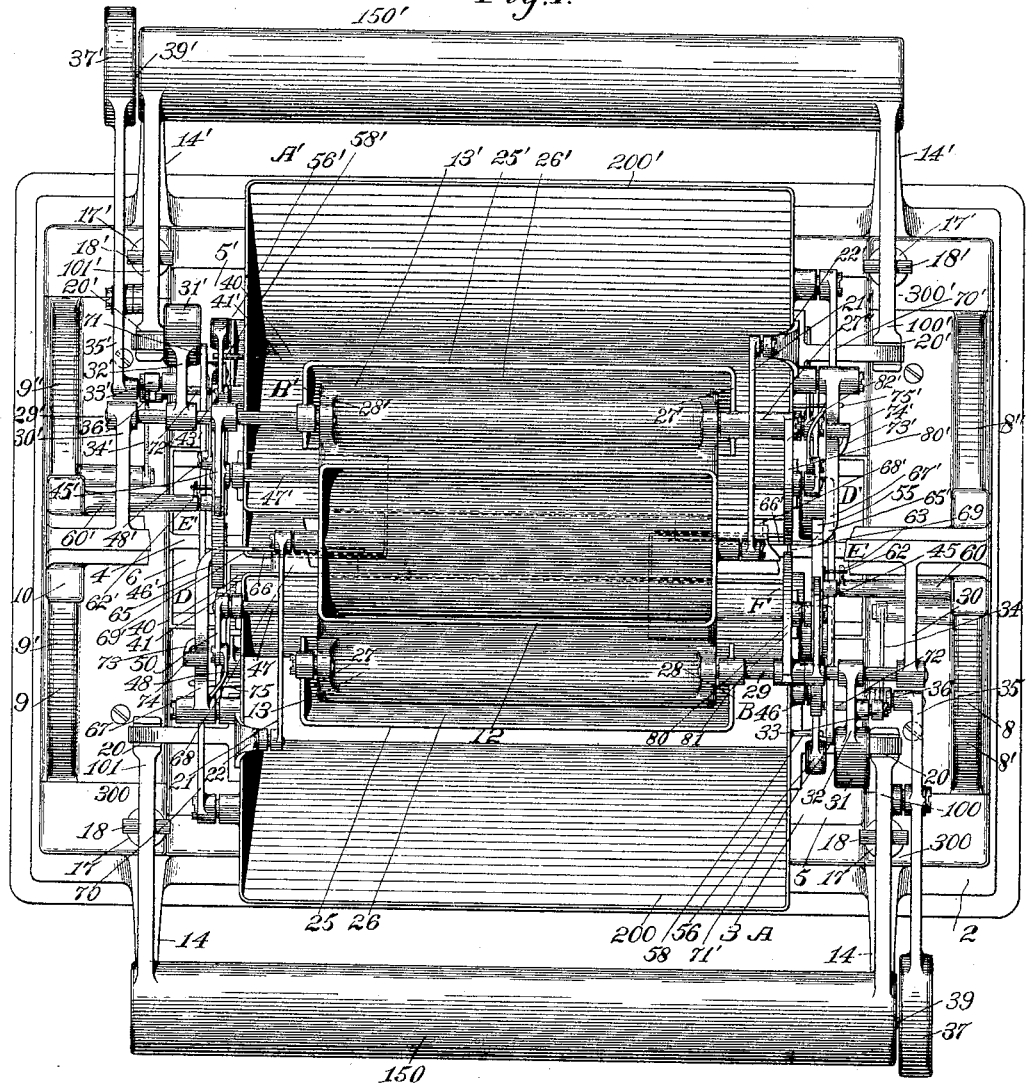
Figure 2:
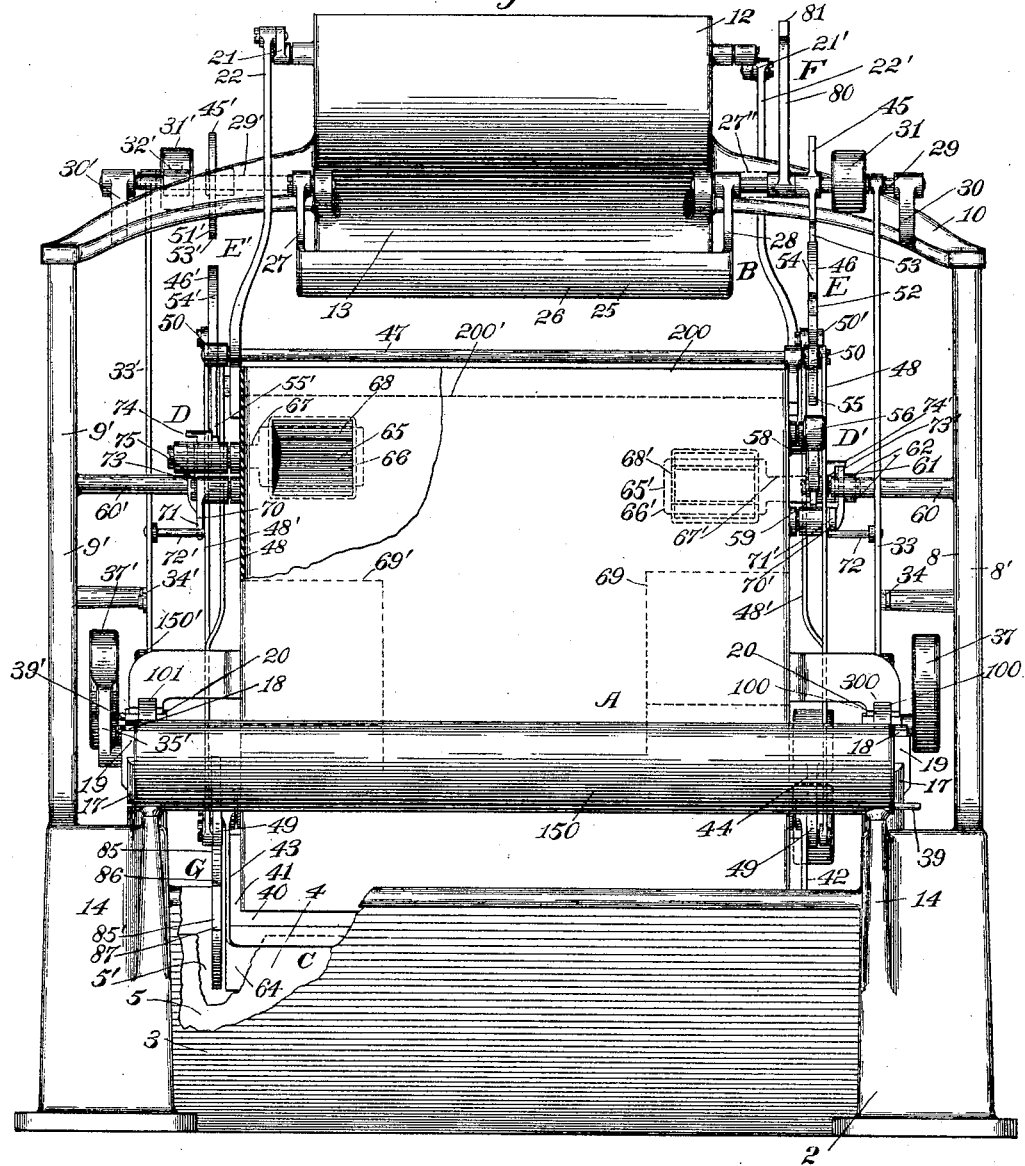
Figure 3:
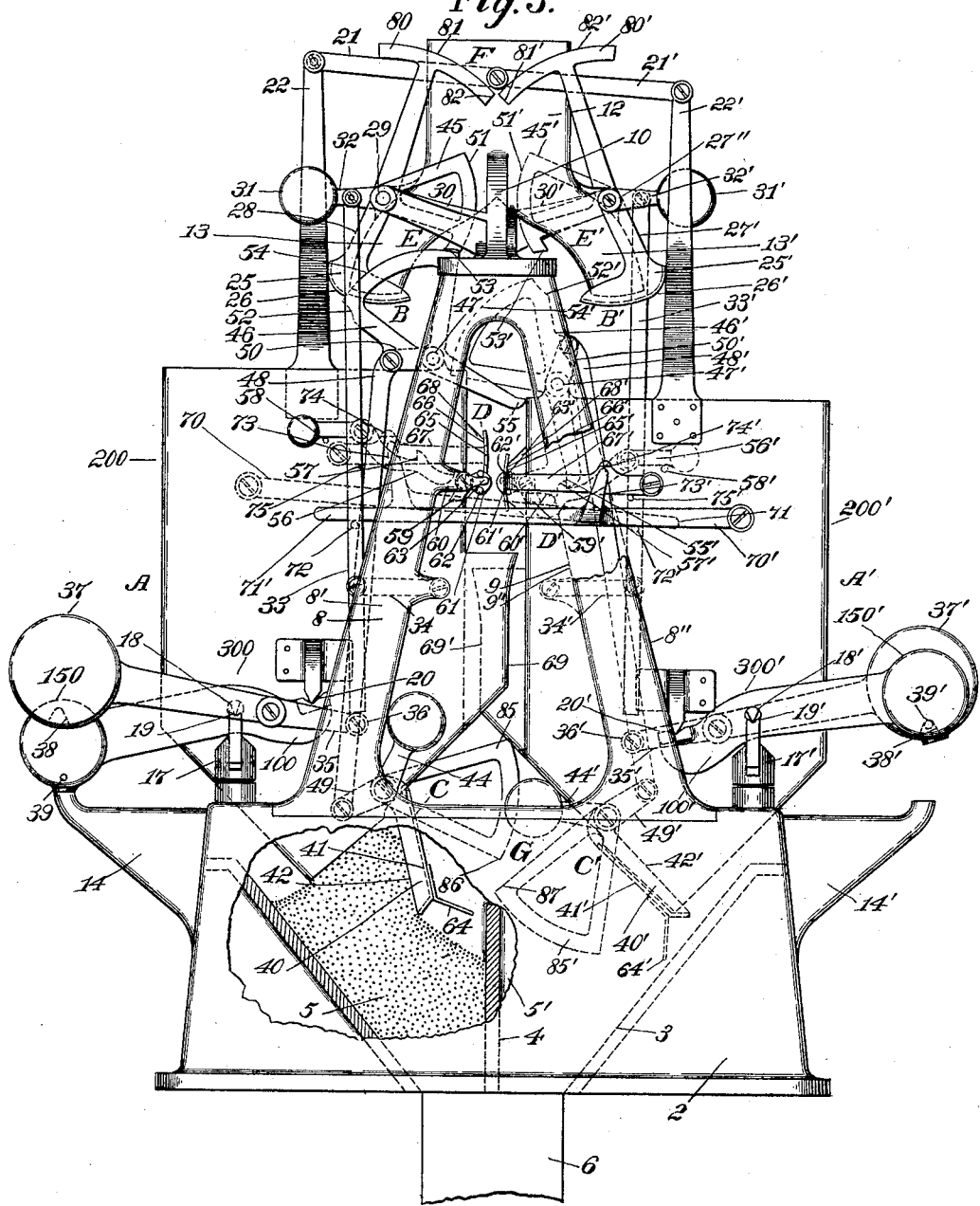
Figure 4:
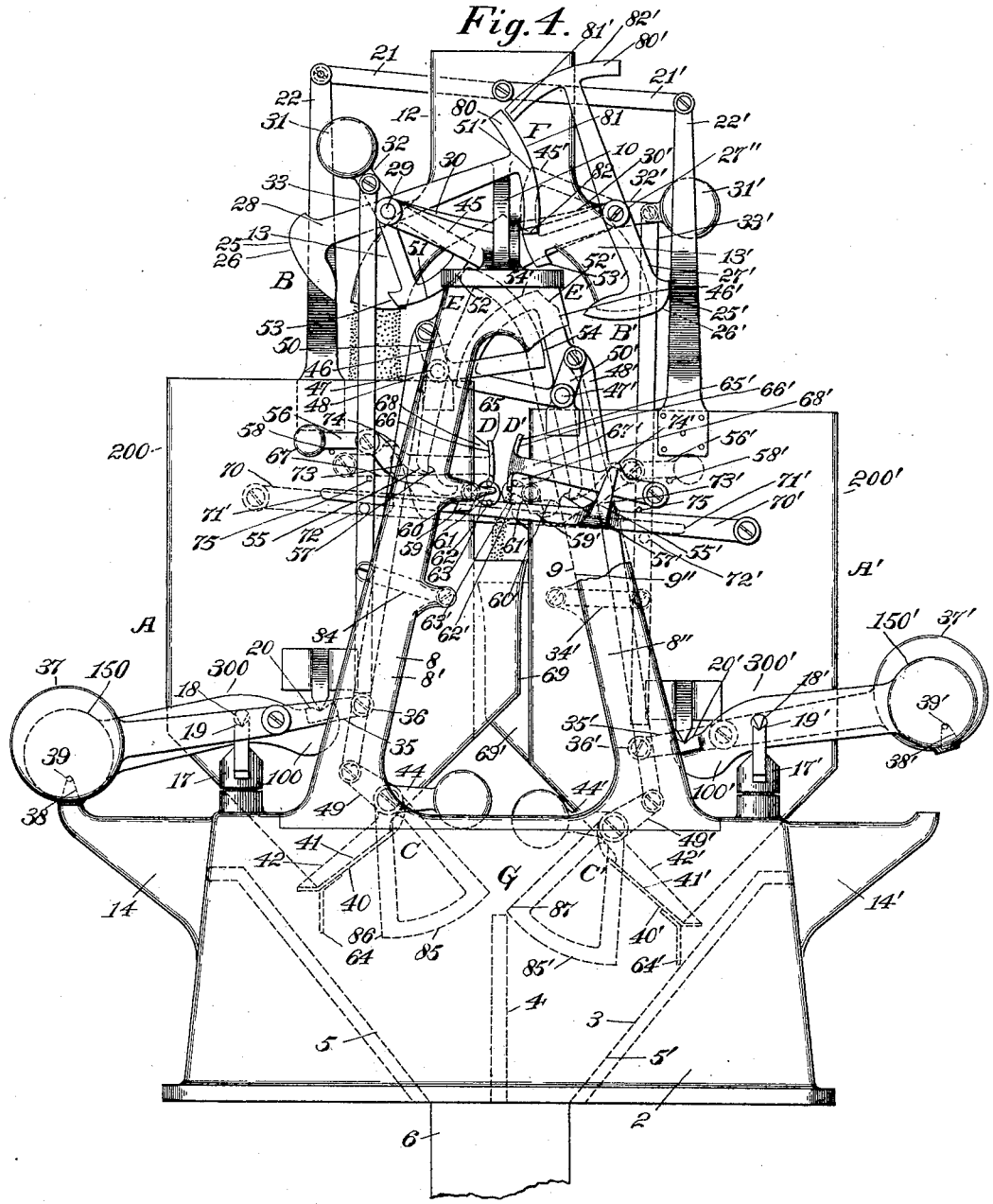
Figure 5:
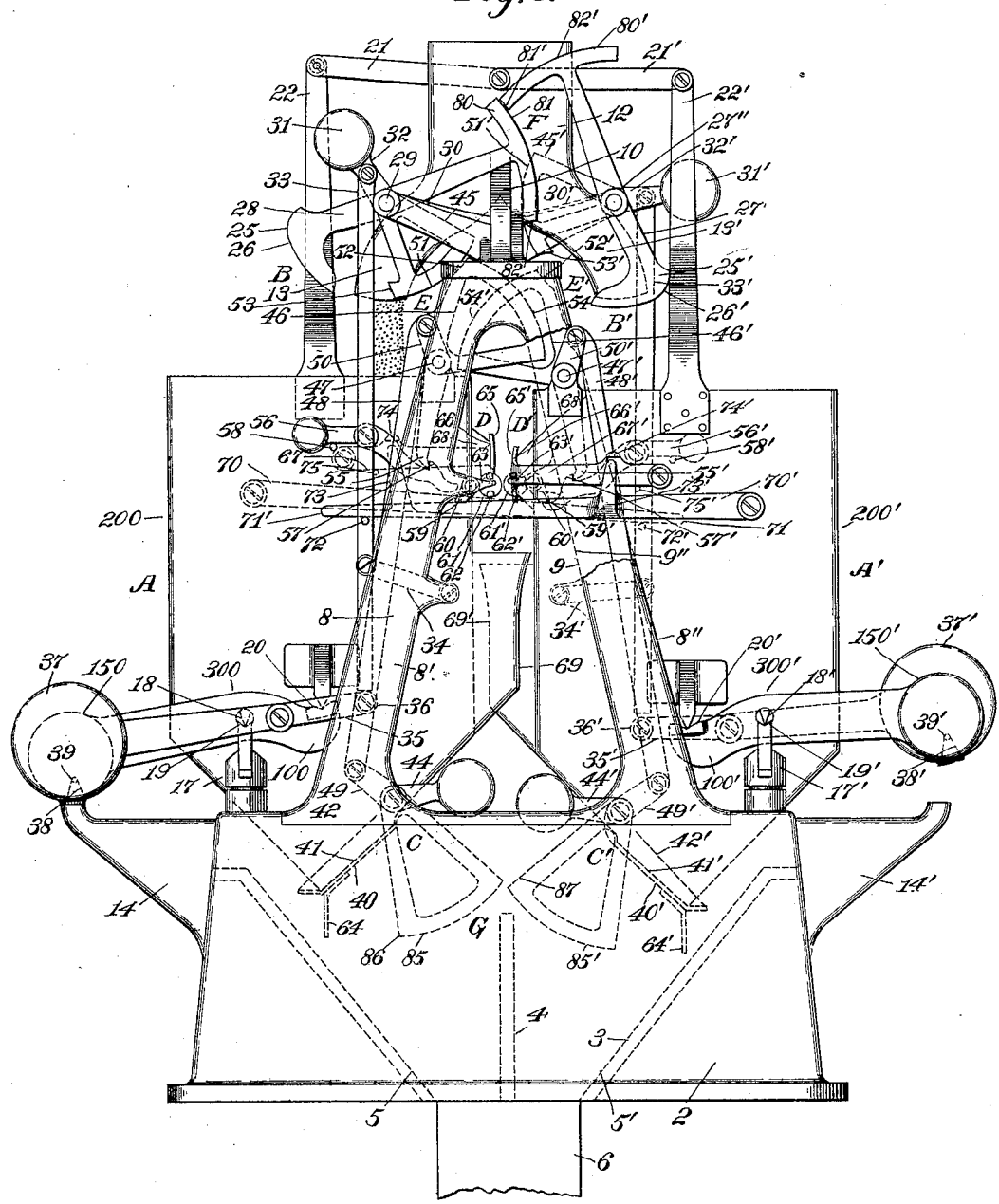
Figure 6:
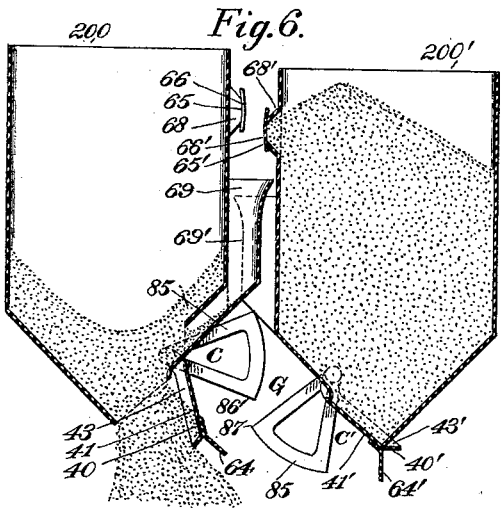
Figure 7:
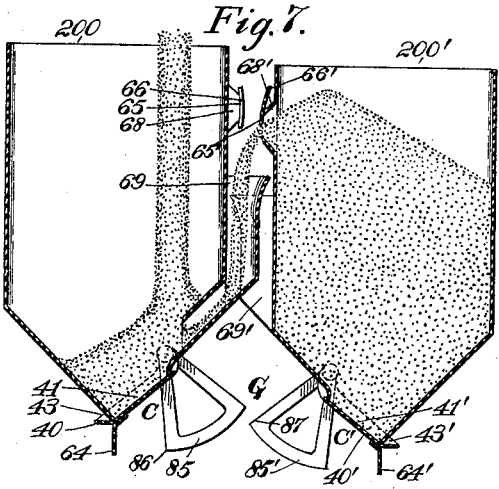
Figure 8:
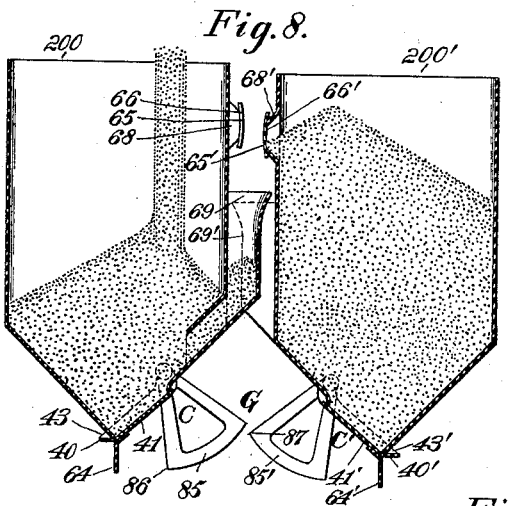
Figure 9:
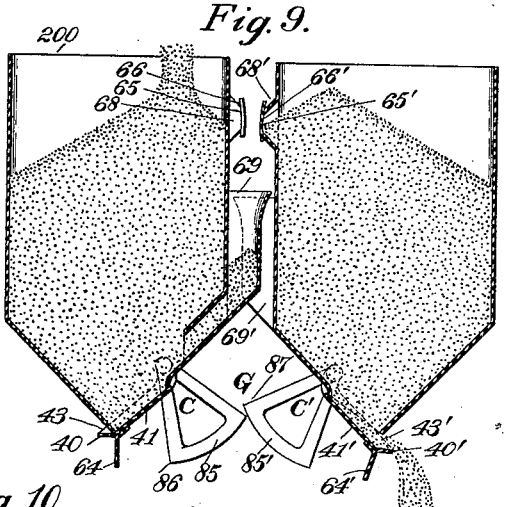
Figure 10:
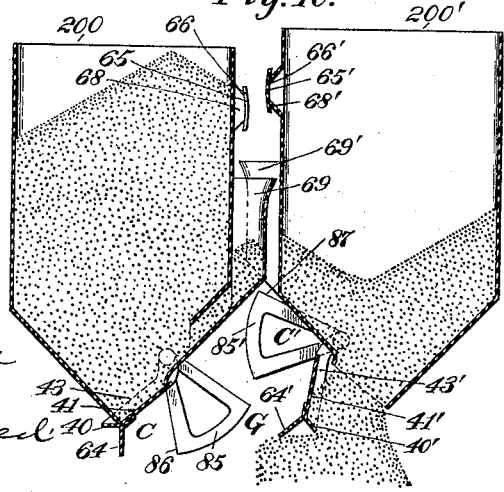
Figure 11:
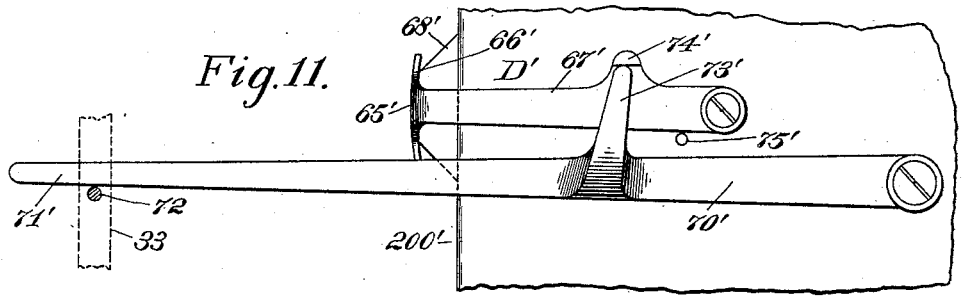
Figure 12:
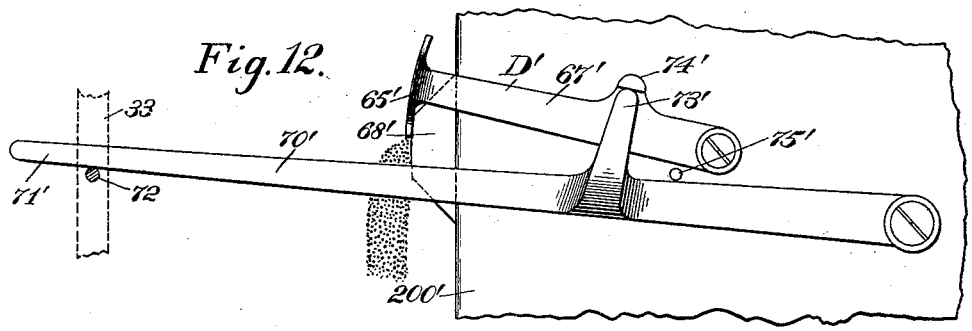
Figure 13:
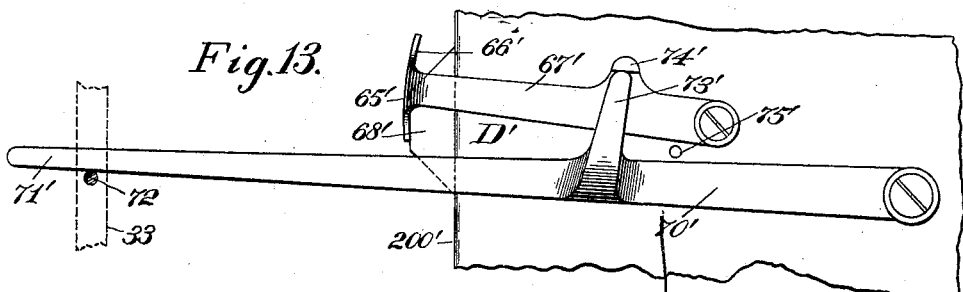
Figure 14:
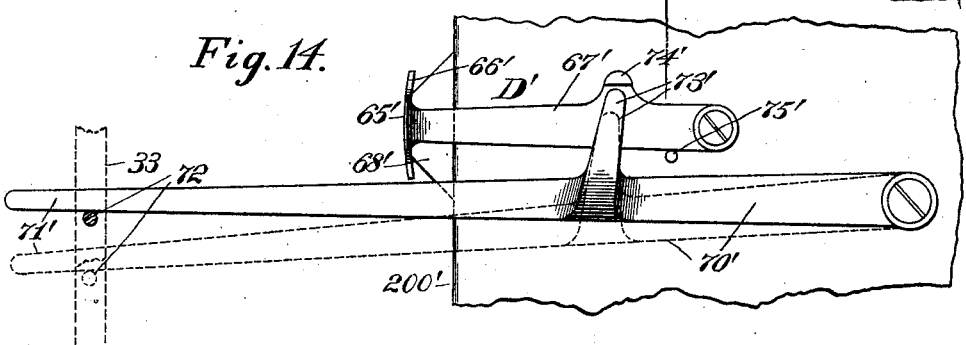

In the drawings accompanying and forming a part of this specification, Figure 1 is a top view of one construction of this improved weighing-machine. Fig. 2 is a front view thereof with parts broken away more clearly to illustrate the operative mechanisms of the machine. Figs. 3, 4, and 5 are progressive side elevations of the machine. Figs. 6 to 10, inclusive, are diagrammatical sectional views of the load-receivers, illustrating the operation thereof relatively to each other. Figs. 11 to 14, inclusive, illustrate one of the load-reducing instrumentalities shown herein and the means for operating the same.

Similar characters of reference designate like parts in all the figures of the drawings.

Heretofore in the use of rising-poise weighing-machines—that is to say, those machines in which an overload is reduced to obtain a true load instead of an underload increased for this purpose—it has been the practice upon the discharge of that portion of the material constituting the overload to reconvey the same back to the load-supply means or chute. This operation not only necessitates some form of reconveying means—such, for instance, as buckets carried by a belt or chain—but may also necessitate a motor to lift such buckets, thereby increasing the running cost of the apparatus, owing to the expense of running the motor. In order, therefore, to obviate this serious disadvantage, an improved weighing-machine is provided in which the overload discharged from one weighing mechanism will be received by and will constitute a part of the load of another weighing mechanism, thereby doing away with all reconveying means heretofore used in weighing-machines of this class.

As a preface to a further description of this improved duplex weighing-machine it will be understood that the operative mechanisms and the means of support therefor can be more or less varied without departing from the general scope of the invention.

As the operative mechanisms of the apparatuses of this duplex weighing-machine are substantially duplicates of each other in construction and operation, it is deemed necessary to describe only one of said apparatuses in detail, with such exceptions, however, as will be hereinafter set forth, corresponding parts in the other apparatus being designated by like characters with prime-marks. In the present structure, however, a majority of the operative devices of one apparatus are shown herein supported at the side opposite to that at which the majority of the operative mechanisms of the other apparatus are carried.

This improved weighing-machine comprises in a general way a plurality of weighing mechanisms, (designated generally by A and A', respectively,) comprehending a plurality of load-receivers, (designated in a general way by 200 and 200', respectively,) and a plurality of beam mechanisms, (designated in a general way by 300 and 300', respectively,) a plurality of material-supply-regulating or stream-controlling means or mechanisms, (designated in a general way by B and B', respectively,) a plurality of material-discharge means, such as closer mechanisms, (designated in a general way by C and C', respectively,) a plurality of load-reducing means or instrumentalities, (designated in a general way by D and D', respectively,) the load-reducing instrumentality of one apparatus being controlled by and on the operation of another apparatus, and in the construction of machine herein shown, through the medium of the weighing mechanism thereof, preferably on the return of said weighing mechanism to its normal position to receive a load after the discharge of its preceding load, a plurality of locking means (designated generally by E and E', respectively) intermediate the stream-controlling means and load-discharging means, and each of which is herein designated for the purpose of this specification as "valve-closer-locking means" and operative to lock the valve shut when the closer is open and to lock the closer shut when the valve is open, and each of which locking means embodies supplemental locking means operative to maintain the closer shut on the unlocking of the main locking means, reciprocally-effective locking means (designated in a general way by F) intermediate the main stream-controlling instrumentalities, whereby when one of said stream-controlling means is open another is locked shut, and reciprocally-effective locking means (designated in a general way by G) intermediate the load-discharge or closer mechanisms, whereby when one of said closer mechanisms is open another will be prevented from opening should the supplemental locking means be prematurely tripped.

The framework for carrying the operative parts of this machine, which in its preferred form is shown as a duplex machine, may be of any suitable construction, but is herein shown comprising a relatively large base 2, having a material-discharge hopper or bin 3, divided by a partition 4 to constitute a pair of hoppers 5 and 5', one beneath the load-discharging means of each weighing mechanism, said hoppers terminating, however, in this structure of machine in the same conduit or outlet 6. Extending upward from this base 2 is a pair of uprights or side frames 8 and 9, each preferably comprising a pair of members 8' and 8" and 9' and 9", respectively, and which side frames or uprights have secured thereto a preferably narrow top plate 10, supporting the duplex material-supply conduit or chute 12, which may be of any suitable or desired construction adapted for the purpose, and shown herein provided with a pair of conduits 13 and 13', each having its mouth disposed above one of the load-receivers.

The weighing mechanism—for instance, that designated generally by A, (the weighing mechanism designated generally by A' being, as above stated, substantially a duplicate thereof)—comprehends, in the preferred form thereof herein shown and described, a load-receiver which may be of any suitable construction, but is shown herein as a receptacle or bucket (designated generally by 200) preferably of the single-chambered type or class, having adjacent to its lower end a main-load-discharging mouth. This load-receiver is carried by beam mechanism (designated generally by 300) comprehending a beam or counterbalancing-weight (designated generally by 150) adapted in its normal position to rest on a pair of supporting arms or brackets 14, extending from the base 2, and which weight has connected therewith a pair of scale beams or arms 100 and 101, adapted to support the load-receiver, and for this purpose each of said beams is supported on the framework by means of suitable adjustable bearings 17, shown herein as knife-edge pivots 18 and V-shaped bearing members 19, the bearing members 19 being preferably carried by the base 2. In the construction shown substantially similar bearings 20 are used between the beam mechanism and load-receiver. To maintain said receiver in proper position during its operation, and thereby prevent lateral or oscillatory movement thereof, it is shown connected to the supply-chute by a pair of connectors 21 and 22, one, as 21, having one end pivotally secured to said chute and its opposite end pivotally secured to an upwardly-extending arm 22, the lower end of which is fixedly secured to the load-receiver at one side thereof.

The stream-controlling means, (designated generally by B,) in the preferred form thereof herein shown and described, comprehends a valve 25, comprising a valve plate or blade 26, having a pair of valve-arms 27 and 28, one at each end thereof. One of the valve-arms, as 27, is shown pivotally secured to one side of the supply-chute conduit 13, while the other, as 28, is rigidly secured to a short rock-shaft 29, one end of which is supported at the opposite side of said chute-conduit 13, while the other end of said shaft is journaled in a bracket 30, projecting from the top plate 10, whereby the valve is in position at the mouth of said conduit 13 to control the supply of material to said load-receiver. The valve is provided with a weight 31, carried by an arm 32, fixedly secured to said rock-shaft 29 and adapted to shut said valve to cut off the stream of material. Suitable means is provided for opening and holding the valve open during the load-receiving period of the apparatus, and which means embodies a valve-actuator, shown herein as a depending member, such as a lever 33, pivotally secured to the weight-arm 32. This valve-actuator is connected to one of the side frames or members, as 8', by means of a suitable connector or link 34, whereby it is held in proper position to engage a part of the beam mechanism, which preferably comprises a supplemental beam-arm 35, shown herein pivotally connected to one of the scale beams or arms, as 100. This supplemental beam-arm 35 is provided adjacent to one end with a projection or roll 36, adapted to engage the lower end of said actuator 33, and at its opposite end with a weight 37. This weight, in view of its position, constitutes a part of the beam-weight and is provided with a recess 38, into which a projection 39, carried by the beam-weight proper, 150, extends, whereby said supplemental weight will be carried upward with said beam-weight on the descent of the load-receiver. When the beam-weight 150 and the supplemental weight 37 are in their normal position, it will be seen that the actuator 33 will be maintained in position to hold the valve open, but that on the descent of the receiver and the consequent ascent of the beam and supplemental weights said actuator will be free to descend, whereupon the valve by means of its weight 31 will shut and cut off the supply-stream.

The material-discharge means, (designated generally by C,) in the preferred form thereof herein shown and described, comprises a closer 40, comprehending a closer blade or plate 41, having a pair of arms 42 and 43, pivotally secured one at each side of the load-receiver adjacent to the discharge-mouth thereof. This closer is provided with a weight for shutting the same after the discharge of the material from the receiver, and which weight is shown carried by an arm 44, projecting from the hub of one of the closer-arms, as 42.

To maintain the closer shut when the valve is open and the valve shut when the closer is open, suitable locking means (designated generally by E) is provided, and in the structure shown it comprises a pair of stops 45 and 46, one, as 45, carried by the valve rock-shaft 29, and therefore movable with the valve, and the other, as 46, carried by a rock-shaft 47, journaled in bearings secured to the load-receiver, and therefore movable with said load-receiver. The stop 46 is operative with the closer, and for this purpose it is shown connected therewith by means of a pair of connectors 48, pivotally secured at their lower ends to arms 49, rigidly secured to the hubs of the closer-arms 42 and 43, and at their upper ends respectively to an arm 50, rigidly secured to the rock-shaft 47 and to the stop 46. From the above it will be seen that when the valve is open the stop-face 51 of the valve-stop 45 will engage the stop-face 52 of the closer-stop, and thereby lock the closer shut, the valve-stop, however, being free to shift on the closing of the valve, at which time the stop-face 53 thereof will engage the stop-face 54 of the closer-stop after the descent of the bucket and the opening of the closer, whereby the valve will be locked shut, the upward movement of the bucket on the partial discharge of the true load tending simply to lock the valve more tightly closed. To prevent the unlocking of the closer when the stops 45 and 46 are disengaged, supplemental locking means is provided, which in the construction shown comprises a depending arm 55, carried by the closer-stop 46 and in position to be engaged by the locker 56.

This locker 56 is shown pivotally secured to the load-receiver and is provided with a catch 57 and is counterweighted, being maintained in its normal position by a stop 58, carried by the receiver. When the closer is shut, the locker-catch 57 is in engagement with the depending arm 55, whereby the closer is locked shut. For the purpose of tripping this locker at a predetermined period, thereby to unlock the closer, a suitable locker-tripper 59 is provided, which in the construction shown is pivotally mounted on a projection or bracket 60, carried by the member 8' of the side frame 8, and comprises a weighted member 61, its movement being limited by a pair of stops 62, carried by the weighted end thereof and engaging a stop member 63 of said projection 60. On the descent of the load-receiver the locker 56 engages and shifts the locker-tripper 59 and moves past the same, whereupon the tripper is shifted by its weight into position to engage the end of said locker 56 on the return or ascent of the load-receiver to its poise position, at which time the closer is unlocked. The closer is preferably provided with a blade or plate 64, constituting regulator means, whereby the shutting of said closer is retarded until all appreciable amount of material has passed from the receiver.

The primary object of this invention is to provide a machine in which the overload, or that part of the material discharged from one load-receiver during the load-reducing period of its weighing mechanism, will be emptied or discharged into and constitute a part of the load in the receiver of another weighing mechanism, whereby the use of reconveying means is obviated. In practice, therefore, each weighing apparatus comprised in the weighing-machine is furnished with a load-reducer, by which is meant some suitable means or instrumentality whereby at the proper time the surplus load of one of the weighing mechanisms may be discharged into the load-receiver of another of the weighing mechanisms of the machine. These load-reducing instrumentalities or means (designated, generally and respectively, by D and D') are operative to cause or permit the reduction of the load, and each, in the preferred form thereof herein shown and described, preferably comprises a stream-controller, such as a valve 65, comprehending a plate or blade 66 and an arm 67, pivotally secured to the load-receiver at one side thereof. This valve-blade is in position to close and open the mouth of an outlet or a spout 68, projecting from one side of the load-receiver and which spout is shown herein disposed directly above a stream or material receiving conduit 69', communicating with the interior of the receiver 200', and which conduit is formed by an extension of said load-receiver of the weighing mechanism A', whereby it will be seen that on the reduction of the load in one receiver the material discharged therefrom during its load-reducing period will flow into the other load-receiver and form a part of the load thereof. From the above it will be seen that the spout of one receiver is directly above the stream-receiving conduit of the other receiver. In this improved duplex machine the operation of each load-reducing instrumentality is effected and controlled at one predetermined period by means of the other apparatus, preferably by means of the weighing mechanism thereof through the medium of the beam mechanism, and for this purpose a load-reducer actuator 70 is pivotally secured to the load-receiver 200 and has its opposite end 71 projecting into position to be engaged by a stop 72', carried by the supply-valve actuator 33'. This load-reducer actuator 70 is provided with an upwardly-extending arm 73, adapted to engage a laterally-extending stop or projection 74 of the valve-arm 67. From the above it will be readily seen by reference to the load-reducing means (designated generally by D', Figs. 4, 11, and 12) that after the true or completed load has been discharged from the receiver 200 the ascent of said receiver to its normal position and the consequent descent of the supplemental beam-weight 37 at the proper time moves the valve-actuator 33 upward, thereby opening the supply-valve 25 and simultaneously shifting the load-receiver actuator 70' of the weighing mechanism A', which in turn, by means of its arm 73' and the reducing-valve stop 74', shifts the load-reducing valve 65' into position to permit the reduction of the overload previously received by said weighing mechanism A', such overload flowing into the load-receiver 200, which at this time is also being supplied with material from the supply-chute. When the overload has been reduced sufficiently to form a true load in the receiver 200', said receiver ascends to its poise position, Figs. 13 and 14, thereby carrying the load-reducing valve 65' upward therewith, and consequently disengaging the stop 74' from the actuator-arm 73', whereby such load-reducing instrumentality returns by its own weight into its normal position, thereby cutting off the outflow of material, the return or downward movement of said instrumentality being limited by a suitable stop 75', carried by the load-receiver. The return movement of the reducing-valve actuator 70' takes place on the descent of the supply-valve actuator 33, which occurs practically simultaneously with the ascent of the beam-weight 150, whereby the load-receiver 200' can descend at the proper time with its next overload without the opening of its reducing-valve. From the above it will be readily seen that while the operation of the load-reducing instrumentality of one apparatus is effected and controlled by the other apparatus through the weighing mechanism thereof by means of its beam mechanism the operation of such load-reducing instrumentality at one predetermined time is also indirectly controlled by the closer, as until such closer shuts the stops 45 and 46 prevent the ascent of the valve-actuator 33 and the consequent descent of the supplemental weight 37.

To lock the main-stream-controlling means of one apparatus tightly closed while the other is open, suitable coacting mechanism is provided, (designated generally by F,) and in the construction thereof herein shown it comprises a pair of stops 80 and 80', one, as 80, being fixedly secured to the supply-valve rock-shaft 29, while the other, as 80', is fixedly secured to a hub 27'' of the other stream-controller 25', whereby when the valve 25 is open, Fig. 4, the stop-face 81 of the stop 80 will be in position to engage the stop-face 81' of the other stop 80', and thereby prevent the opening of the valve 25', the same result being secured when the valve 25 is closed and the valve 25' is open, at which time the stop-faces 82 and 82' will be in engagement.

To prevent the opening of the closer of one apparatus during the main-load-discharging period of its companion apparatus, suitable reciprocally-effective locking means (designated generally by G) is provided, whereby should the supplemental locking means 55 and 56 or 55' and 56' be prematurely tripped the opening of the closer of one apparatus would be prevented while the closer of the other apparatus is open. This locking means, in the form shown herein, preferably comprises a pair of stops 85 and 85', carried one by the hub of each closer 40 and 40', respectively. As in this construction of apparatus the closers open toward each other, it will be seen that when, for instance, the closer 40 is open, Fig. 3, the stop-face 86 of the stop 85 will be in position to engage the stop-face 87 of the closer-stop 85', whereby the opening of the closer 40' will be prevented. In this construction of apparatus a slight play is permitted between the said stops 85 and 85', this being provided for by the increased lengths of the closers at the outer ends thereof.

The operation of this improved duplex weighing-machine is substantially as follows: The load-receiver 200 having received an overload and the same having been reduced, said receiver ascends to a poise, whereupon the closer is opened and the discharge of the load takes place, Fig. 3, at which time the operative mechanisms of the duplex machine are substantially in the positions shown in Fig. 3, from which it will be seen that the receiver 200' of the weighing mechanism A' has descended with its overload, Fig. 6, and is in position to have such overload reduced. When all appreciable amount of material has passed from the load-receiver 200, the closer 40 will shut, thereby unlocking the main-stream controller 25, owing to the disengagement of the stops 45 and 46, at which time the supplemental weight 37, which ascended with the beam-weight 150 and was held in such ascended position, owing to the engagement of said stops 45 and 46, will be permitted to descend, thereby moving the supply-valve actuator 33 upward and opening the supply-valve 25 to permit the supply of material to flow into the load-receiver. This upward movement of the supply-valve actuator 33 operates by means of the stop 72 to shift the load-reducer actuator 70' upward, and thereby, through the arm 73' and the stop 74', the load-reducing valve 65' is moved upward, whereby the overload in the receiver 200' is discharged into the stream-receiving conduit 69 of the receiver 200 simultaneously with the main supply thereto, Figs. 4 and 7, the supply-stream controller 25' at this time being locked closed by the engagement of the stops 80 and 80'. When the overload has been discharged from the receiver 200', such receiver ascends to its poise position, thereby disengaging the reducer-arm stop 74' from the actuator-arm 73' and permitting the load-reducer valve 65 to close and thereby cut off the discharge of material. When the reduction of the load has been obtained, it will be seen that as the reducer-valve 65' cuts off such outflow the closer-locker 56' is in position to be engaged by the locker-tripper 59', Fig. 5, whereby the closer is unlocked and permitted to open by the weight of its load, whereupon such load is discharged. This opening movement of the closer 40' carries its stop 85' into position to prevent the opening movement of the closer 40 of the receiver 200, Figs. 9 and 10. From the foregoing and by reference to Figs. 6 to 10, inclusive, it will be seen, Fig. 6, that during the latter part of the main discharge from the receiver 200 the receiver 200' has received an overload and has descended to its overpoise position in readiness to have such overload reduced, and which reduction takes place, as above set forth, on the reascent of the receiver 200 to receive another load, such reduction also taking place, in the construction of apparatus shown herein, simultaneously with the main supply to the receiver 200, so that such receiver 200 is supplied with material from different sources at the same time. When the overload has been properly reduced, the discharge thereof is cut off, Fig. 8, and the closer 40' unlocked, Fig. 9, and thereupon opens to discharge the load, Fig. 10, while at this time the load-receiver 200 has practically received its load and is in position to have the same reduced on the ascent of the receiver 200'. It will therefore be observed that the receptacles discharge their true loads in alternation, that one receptacle is filling while the other is having its load reduced, and that the discharge of the true load from one receptacle commences while the other receptacle is still being supplied with material.

In conclusion it will be seen that the operation of the load-reducing instrumentality of one apparatus is effected and controlled by the other apparatus, preferably through the weighing mechanism thereof, and preferably through the beam mechanism forming a part of such weighing mechanism, and is, moreover, controlled on the ascent of a load-receiver to receive a load, whereby the reduction of the overload in the receiver of one apparatus takes place simultaneously with the supply of material to the receiver of the other apparatus.

It will also be seen that the supply-valve actuator 33 is the means through which the beam mechanism operates the load-reducing valve and that such reducing-valve is permitted to close upon the ascent of its receiver, from which it follows that the beam mechanism of one apparatus controls the opening of the reducing-valve of the other apparatus, while the closing movement thereof is controlled by its own weighing mechanism.

Having thus described my invention, I claim—

1. The combination of a pair of weighing apparatuses, one provided with a load-reducing instrumentality operative to reduce a load before the final discharge thereof; and actuator means intermediate said load-reducing instrumentality and the other apparatus, whereby the operation of said load-reducing instrumentality is effected at one predetermined period by and on the operation of said other apparatus.

2. The combination of a pair of weighing apparatuses, each provided with a load-reducing instrumentality operative to reduce a load before the final discharge thereof; and actuator means intermediate each apparatus and the load-reducing instrumentality of its companion apparatus, whereby the operation of the load-reducing instrumentality of one apparatus is effected at one predetermined period by and on the operation of the other apparatus.

3. A weighing-machine comprising a plurality of apparatuses, each provided with a load-reducing instrumentality operative to reduce a load before the final discharge thereof, the operation of the load-reducing instrumentality of one apparatus being effected at one predetermined period by and on the operation of another of said apparatuses.

4. A weighing-machine comprising a plurality of apparatuses, one provided with a load-reducing instrumentality operative to reduce a load before the final discharge thereof, the operation of said instrumentality being effected at one predetermined period by and on the operation of another of said apparatuses.

5. The combination of a plurality of weighing mechanisms; a load-reducing instrumentality for each of said weighing mechanisms, and operative to reduce a load before the final discharge thereof, the operation of the load-reducing instrumentality of one weighing mechanism being effected by and on the operation of another of said weighing mechanisms.

6. The combination of a plurality of weighing mechanisms, one provided with a load-reducing instrumentality operative to reduce a load before the final discharge thereof; and means adapted to effect the operation thereof, and controlled by and on the operation of another of said weighing mechanisms.

7. The combination of a pair of weighing mechanisms, each provided with a load-reducing instrumentality operative to reduce a load before the final discharge thereof; and means adapted to effect the operation of the load-reducing instrumentality of one weighing mechanism on the operation of the other weighing mechanism.

8. A weighing-machine comprehending a plurality of weighing mechanisms, one provided with a load-reducing instrumentality operated by and on the operation of another of said weighing mechanisms to reduce a load before the final discharge thereof, and adapted to cut off such reduction at one predetermined period on the operation of its own weighing mechanism.

9. A weighing-machine comprehending a plurality of weighing mechanisms, each provided with a load-reducing instrumentality operated by and on the operation of another of said weighing mechanisms to reduce a load before the final discharge thereof, and adapted to cut off such reduction at one predetermined period on the operation of its own weighing mechanism.

10. The combination of a plurality of weighing mechanisms, one provided with a load-reducing valve; and actuator means intermediate said load-reducing valve and another of said weighing mechanisms, and operative to open said load-reducing valve on the operation of said other weighing mechanism, thereby to permit the reduction of the load before the final discharge thereof, and said valve being adapted to close at one predetermined period on the operation of its own weighing mechanism, thereby to cut off such reduction.

11. A weighing-machine comprehending a plurality of weighing mechanisms, each provided with a load-reducing valve opened by and on the operation of another of said weighing mechanisms to effect the reduction of a load before the final discharge thereof.

12. A duplex weighing-machine comprising a plurality of coacting weighing mechanisms, each having a load-reducing valve operable to open and thereby effect the reduction of the load before the final discharge thereof, and adapted to close at one predetermined period on the operation of its own weighing mechanism, and thereby cut off such reduction.

13. The combination of a plurality of weighing mechanisms, each embodying a load-receiver and beam mechanism therefor; a load-reducing instrumentality for one of said weighing mechanisms, and operative by and on the operation of the beam mechanism of another of said weighing mechanisms, thereby to reduce a load before the final discharge thereof.

14. The combination of a plurality of weighing mechanisms, each embodying a load-receiver and beam mechanism therefor; a load-reducing instrumentality for each of said weighing mechanisms, the load-reducing instrumentality of one weighing mechanism being operated by the beam mechanism of another of said weighing mechanisms, thereby to reduce a load before the final discharge thereof.

15. The combination of a pair of weighing mechanisms, each embodying a load-receiver and beam mechanism therefor; a load-reducing instrumentality for each of said weighing mechanisms; and actuator means intermediate the load-reducing instrumentality of each of said weighing mechanisms and the beam mechanism of the other weighing mechanism, whereby said load-reducing instrumentality is operated, thereby to reduce a load before the final discharge thereof.

16. The combination of a pair of weighing mechanisms, each embodying a load-receiver and beam mechanism therefor; overload-supply means for each of said weighing mechanisms; a load-reducing valve for each of said weighing mechanisms; and actuator means intermediate the load-reducing valve of each of said weighing mechanisms and the beam mechanism of the other weighing mechanism, whereby said load-reducing valve is operated, thereby to reduce a load before the final discharge thereof.

17. In a weighing-machine, the combination of a pair of weighing mechanisms, each embodying a load-receiver having a load-reducer, and said machine having the load-reducer of one weighing mechanism located to discharge the surplus material of the load of the one weighing mechanism into the load-receiver of the other weighing mechanism.

18. In a weighing-machine, the combination of a pair of weighing mechanisms, each embodying a load-receiver having a load-reducer, said machine having the load-reducer of one weighing mechanism located to discharge the surplus material of the load of the one weighing mechanism into the load-receiver of the other weighing mechanism; and said machine also having supply means for simultaneously supplying material to said receiver during its reception of such surplus material.

19. In a weighing-machine, the combination of a pair of coacting weighing mechanisms, each embodying a load-receiver; and mechanism operative to effect the overload of the receiver of one weighing mechanism during a predetermined period, and then operative to effect the reduction of such overload and the discharge of the surplus thereof into its companion receiver simultaneously with a supply of material to said companion receiver.

20. In a weighing-machine, the combination of a pair of weighing mechanisms, each embodying a load-receiver having load-discharge means and load-reducing means; and actuator means for operating the load-reducing means of each weighing mechanism on the operation of its companion weighing mechanism, and controlled in its operation, at one predetermined period, by the load-discharge means of said companion weighing mechanism.

21. In a weighing-machine, the combination of a pair of weighing mechanisms, each embodying a load-receiver having a closer and a load-reducer; a stream-controller for each of said receivers; reciprocally-effective locking means for each coacting stream controller and closer, and operative to lock the closer shut when the stream-controller is open, and to lock the stream-controller shut when the closer is open; and actuator means for operating the load-reducer of one weighing mechanism on the operation of its companion weighing mechanism, and controlled in its operation at one predetermined period by and on the shutting of the closer of said companion weighing mechanism.

22. In a weighing-machine, the combination of a plurality of weighing mechanisms, each embodying a load-receiver, and one of said receivers having a stream-receiving conduit, and another of said receivers having a load-reducing outlet disposed adjacent to said stream-receiving conduit.

23. In a weighing-machine, the combination of a plurality of weighing mechanisms, each embodying a load-receiver provided with a stream-receiving conduit and a load-reducing opening, each receiver having its opening disposed adjacent to the stream-receiving conduit of another of said receivers.

24. In a duplex weighing-machine, the combination of a pair of weighing mechanisms, each embodying a load-receiver provided with a stream-receiving conduit at the lower part thereof, and a load-reducing opening at the upper part thereof, each receiver having its opening disposed adjacent to the stream-receiving conduit of the other receiver.

25. In a duplex weighing-machine, the combination of a pair of weighing mechanisms, each embodying a load-receiver provided with a stream-receiving conduit and a load-reducing outlet, each of said receivers having its conduit and outlet disposed intermediate said receivers, and also having its outlet disposed directly above the stream-receiving conduit of the other receiver.

26. In a duplex weighing-machine, the combination of a pair of weighing mechanisms, each embodying a load-receiver provided with a stream-receiving conduit and a load-reducing outlet, each of said receivers having its conduit and outlet disposed diagonally opposite to each other, whereby each receiver has its load-reducing opening adjacent to the stream-receiving conduit of the other receiver.

27. The combination of a plurality of weighing mechanisms, each embodying a load-receiver provided with a stream-receiving conduit and a load-reducing opening, each receiver having its opening disposed adjacent to the stream-receiving conduit of another of said receivers; and a load-reducing instrumentality for each weighing mechanism and operative to effect the reduction of the load, whereby the material discharged during the load-reducing period of one receiver will be received by another receiver.

28. The combination of a pair of weighing mechanisms, each embodying a load-receiver, one provided with a stream-receiving conduit, and the other with a load-reducing opening disposed adjacent to said stream-receiving conduit of its companion receiver; a load-reducing instrumentality for that weighing mechanism having the load-reducing opening; and actuator means intermediate said load-reducing instrumentality and the weighing mechanism having the stream-receiving conduit, whereby said instrumentality is operative by and on the operation of said last-mentioned weighing mechanism, thereby to effect a reduction of the load before the final discharge thereof, and whereby the material discharged through the load-reducing opening during the load-reducing period of said receiver will be received by the conduit of the other receiver.

29. The combination of a pair of weighing mechanisms, each embodying a load-receiver provided with a stream-receiving conduit and with a load-reducing opening, the opening of each receiver being adjacent to the stream-receiving conduit of the other receiver; a load-reducing instrumentality for each of said weighing mechanisms; and actuator means intermediate the load-reducing instrumentality of each weighing mechanism and the other weighing mechanism, whereby said instrumentality is operative, by and on the operation of said other weighing mechanism, to effect a reduction of the load before the final discharge thereof, and whereby the material discharged during the load-reducing period of one receiver will be received by the other receiver.

30. In a weighing-machine, the combination of a pair of weighing mechanisms, each embodying a load-receiver provided with a stream-receiving conduit and with a load-reducing opening, the opening of each receiver being in juxtaposition to the stream-receiving conduit of the other receiver; a load-reducing instrumentality for each of said weighing mechanisms; and actuator means intermediate the load-reducing instrumentality of each weighing mechanism and the other weighing mechanism, whereby said instrumentality is operative by and on the operation of said other weighing mechanism to effect a reduction of a load before the final discharge thereof, and whereby the material discharged during the load-reducing period of one receiver will be received by the other receiver, and each of said load-reducing instrumentalities being operative, on the operation of its own weighing mechanism, to cut off the reduction of the load.

31. The combination of a pair of weighing apparatuses, each embodying a load-receiver having a stream-receiving conduit and a load-reducing opening, the opening of each receiver being disposed above the stream-receiving conduit of the other receiver; and a plurality of load-reducing means operative to effect the reduction of a load before the final discharge thereof, and comprising valves disposed in position one adjacent to the load-reducing opening of each receiver.

32. In a weighing-machine, the combination of a pair of weighing apparatuses, each embodying a load-receiver having a stream-receiving conduit and a load-reducing opening, the opening of each receiver being disposed above the stream-receiving conduit of the other receiver; a plurality of load-reducing means operative to effect the reduction of the load before the final discharge thereof, and comprising valves disposed in position one adjacent to the load-reducing opening of each receiver; and actuator means for operating the valve of one apparatus on the operation of the other apparatus.

33. The combination of a pair of weighing apparatuses, each embodying weighing mechanism comprising a load-receiver and beam mechanism therefor, each of said receivers having a stream-receiving conduit and a load-reducing outlet; a plurality of load-reducing valves, one carried by each receiver and adapted to control the reduction of the load before the final discharge thereof; and means operative by the beam mechanism of each apparatus for effecting the operation of the load-reducing valve of the other apparatus.

34. The combination of a pair of weighing apparatuses, each embodying weighing mechanism comprising a load-receiver and beam mechanism therefor, one of said receivers having a stream-receiving conduit, and the other of said receivers having a load-reducing outlet adjacent to said stream-receiving conduit; a load-reducing instrumentality carried by that receiver having the load-reducing outlet, and adapted to effect the reduction of a load before the final discharge thereof; overload-supply means for each of said receivers; stream-controllers for each of said overload-supply means; actuator means intermediate the weighing mechanism and stream-controller of each apparatus for effecting the operation of said stream-controller at one predetermined period; and an actuating instrumentality intermediate said load-reducing instrumentality of one of said weighing apparatuses and the stream-controller actuator of the other apparatus.

35. The combination of a pair of weighing apparatuses, each embodying weighing mechanism comprising a load-receiver and beam mechanism therefor, each of said receivers having a stream-receiving conduit and a load-reducing outlet; a plurality of load-reducing valves, one carried by each receiver and adapted to control the reduction of the load before the final discharge thereof; supply-stream controllers; actuator means intermediate the beam mechanism and stream-controller of each apparatus for effecting the operation of said stream-controller at one predetermined period; and actuator means operative by the stream-controller-actuating means of one apparatus to effect the operation of the load-reducing means of the other apparatus.

36. In a duplex weighing-machine, the combination of a pair of weighing apparatuses, each embodying weighing mechanism comprising a load-receiver and beam mechanism supporting said receiver; overload-supply means for each receiver; stream-controlling means for each of said supply means; a load-reducing instrumentality for each receiver; actuator means intermediate the beam mechanism and the stream-controlling means of each apparatus, whereby the operation of said stream-controlling means is effected at one predetermined period by the beam mechanism; and actuator means intermediate the load-reducing instrumentality of each apparatus and the stream-controlling actuator of the other apparatus, whereby, simultaneously with the operation of the stream-controlling means of one apparatus, the operation of the load-reducing instrumentality of the other apparatus is effected.

37. The combination of a pair of weighing apparatuses, each embodying a load-receiver and beam mechanism for supporting said receiver, and each of said receivers having a stream-receiving conduit and a load-reducing outlet, the outlet of each receiver being disposed above the stream-receiving conduit of the other receiver; overload-supply means for each receiver; stream-controlling means for each of said supply means; an actuator intermediate the beam mechanism and the stream-controlling means of each weighing apparatus, whereby the opening of the stream-controlling means is effected by the beam mechanism; a load-reducing instrumentality for each receiver, and in position to control the flow of material from the receiver-outlet; an actuator for each load-reducing instrumentality, the actuator for the load-reducing instrumentality of one apparatus being in position to be engaged by the stream-controller actuator of the other apparatus on the opening of said stream-controller, thereby simultaneously to operate said load-reducing instrumentality.

38. The combination of a pair of weighing apparatuses, each embodying weighing mechanism comprising a load-receiver and beam mechanism supporting said receiver, each of said receivers having a stream-receiving conduit and a load-reducing outlet, the outlet of each receiver being adjacent to the stream-receiving conduit of the other receiver; a plurality of load-reducing valves, one carried by each receiver and adapted to control the reduction of the load; overload-supply means for each of said receivers; a stream-controlling valve for each of said supply means; actuator means intermediate the beam mechanism and stream-controlling valve of each apparatus for effecting the operation of said stream-controlling means at one predetermined period; and actuator means operative by the stream-controller-actuator means of one apparatus to effect the operation of the load-reducing means of the other apparatus, whereby the discharge of the surplus material of the load of one load-receiver will occur substantially simultaneously with, and form a part of, the supply of material to the other load-receiver.

39. The combination of a pair of weighing apparatuses, each embodying a load-receiver and beam mechanism for supporting said receiver, each of said receivers having a stream-receiving conduit and a load-reducing outlet, the outlet of each receiver being disposed above the stream-receiving conduit of the other receiver; overload-supply means for each receiver; an actuator intermediate the beam mechanism and the stream-controlling means of each weighing apparatus, whereby the opening of the stream-controlling means is effected by the beam mechanism; a stop carried by each of said actuators; a load-reducing valve carried by each of said receivers, and operable to open and close the load-reducing outlet, and comprising a valve-plate and an arm pivotally secured to said receiver and provided with a stop; means for controlling the operation of said load-reducing valves, and comprising a pair of actuators pivotally secured one to each load-receiver, and each provided with an arm adapted to engage its respective valve-arm stop, the actuator for the load-reducing valve of one weighing apparatus having an end thereof extending into position to be engaged by the stop carried by the stream-controller actuator of the other weighing apparatus.

40. A weighing-machine comprising a plurality of coacting weighing mechanisms; a load-reducing instrumentality for one of said weighing mechanisms; and means connecting said weighing mechanisms whereby they coact to have the load-reducing instrumentality of said weighing mechanism reduce the load thereof during the reception of the load by another of said mechanisms.

41. A weighing-machine comprising a pair of coacting weighing mechanisms, each having a load-reducing instrumentality operable to reduce the load thereof; and means connecting said weighing mechanisms whereby they coact to have the load-reducing instrumentality of one weighing mechanism reduce the load on the ascent of the other weighing mechanism to receive its load.

42. In a weighing-machine, the combination of a pair of weighing mechanisms; a load-reducing valve carried by one of said weighing mechanisms; and means for effecting the operation of said valve, and operative by and on the operation of the other weighing mechanism.

43. The combination of a pair of weighing mechanisms each embodying a load-receiver, one of said receivers having a stream-receiving conduit, and the other of said receivers having a stream-outlet; a load-reducing valve carried by said last-mentioned receiver and operative to control the reduction of the load; a load-reducing valve-actuator also carried by said last-mentioned receiver, and extending into position to be operated by and on the operation of the other weighing mechanism.

44. The combination of a pair of weighing mechanisms, one of said weighing mechanisms embodying a load-receiver having an outlet; a load-reducing valve comprising a valve-plate and an arm pivotally secured to said receiver and provided with a stop; a valve-actuator carried by said receiver and having an arm adapted to engage said stop, and also having a part thereof extending into position to be operated by the other weighing mechanism.

45. The combination of a pair of weighing mechanisms; load-supply means for each of said weighing mechanisms; a stream-controller for regulating the supply of material to each weighing mechanism; and reciprocally-effective means intermediate said stream-controllers, and operable, when one of said stream-controllers is in operation, to lock the other against operation.

46. The combination of a pair of weighing mechanisms; load-supply means for each of said weighing mechanisms; a stream-controller for regulating the supply to each weighing mechanism; and a pair of reciprocally-effective stops carried one by each of said stream-controllers, and operative, on the opening of one stream-controller, to lock the other stream-controller shut.

47. In a weighing-machine, the combination of a plurality of coacting rising-poise weighing mechanisms; load-discharge means for each of said weighing mechanisms and operative on the ascent thereof to its poise position; a load-reducing instrumentality for each of said weighing mechanisms; means connecting said weighing mechanisms, whereby they coact to have the load-reducing instrumentality of one of said weighing mechanisms reduce the load thereof during the reception of the load by another of said weighing mechanisms; and reciprocally-effective means operative on the operation of one of said load-discharge means to lock the other against operation.

48. In a duplex weighing-machine, the combination of a plurality of weighing apparatuses, each embodying weighing mechanism comprising a load-receiver and beam mechanism supporting said receiver, and each of said receivers having a stream-receiving conduit and a stream-outlet, the stream-outlet of each receiver being above the stream-receiving conduit of the other receiver; overload-supply means for each load-receiver; a plurality of stream-controllers for regulating the supply to said receivers; a plurality of stream-controller actuators operated by the beam mechanisms for opening said stream-controllers; a load-reducing instrumentality for each of said receivers; an actuator for each of said load-reducing instrumentalities, the load-reducing-instrumentality actuator of one weighing mechanism being operated by and on the operation of the other weighing mechanism, and simultaneously with the opening of the stream-controller of said other weighing mechanism, whereby, during the supply of material to one receiver, a reduction of the overload in the other receiver takes place; load-discharge means for each receiver; locking means intermediate the stream-controller and the load-discharge means of each weighing apparatus, and operative to lock the stream-controller shut when the load-discharge means is open, and to lock the load-discharge means shut when the stream-controller is open; reciprocally-effective locking means intermediate the stream-controller means of said apparatuses, and operative to lock one stream-controller shut when the other stream-controller is open; and reciprocally-effective locking means intermediate the load-discharge means of said apparatuses, and operative to lock one load-discharge means shut when the other is open.

49. In a duplex weighing-machine, the combination of a plurality of weighing apparatuses each embodying weighing mechanism comprising a reciprocatory load-receiver having a closer and beam mechanism supporting said receiver, and each of said receivers having a stream-receiving conduit and a stream-outlet, the outlet of each receiver being directly above the stream-receiving conduit of the other receiver; overload-supply means for each load-receiver; a valve for regulating the supply to each of said receivers; a plurality of valve-actuators operated by said beam mechanisms for opening said valves; a load-reducing valve carried by each of said receivers; an actuator for each of said load-reducing valves, the reducing-valve actuator of one weighing mechanism being operated by and on the operation of the beam mechanism of the other weighing mechanism, and simultaneously with the opening of the supply-valve of said other weighing mechanism, whereby, on the supply of material to one receiver, a reduction of the overload in the other receiver takes place; locking means intermediate the supply-valve and the closer of each apparatus, and operative to lock the supply-valve shut when the closer is open, and to lock the closer shut when the supply-valve is open; reciprocally-effective locking means intermediate the supply-valves of said apparatuses, and operative to lock one supply-valve shut when the other is open; and reciprocally-effective locking means intermediate the closers of said receivers and operative to lock one closer shut when the other is open.

50. The combination of a pair of weighing apparatuses each comprising weighing mechanism embodying a load-receiver and beam mechanism, one of said beam mechanisms embodying a supplemental beam-arm operative therewith, and one of said receivers having a stream-receiving conduit, and the other of said receivers having a load-reducing outlet; a load-reducing instrumentality for said last-mentioned receiver; load-supply means for each of said receivers; a stream-controller for each of said load-supply means; an actuator intermediate said supplemental beam-arm and one of said stream-controllers and operative to open the same; and an actuator for effecting the operation of said load-reducing instrumentality, and in position to be engaged by said stream-controller actuator on the operation thereof by the beam mechanism.

51. In a duplex weighing-machine, the combination with a pair of coacting weighing mechanisms, each embodying a load-receiver and beam mechanism therefor, of mechanism operable to effect the overloading of one receiver before the completion of the load-discharge of the other receiver; and then to effect the reduction of such overload during the supply to the other receiver, whereby the surplus of the load discharged from one receiver assists the loading of the other receiver.

52. In a duplex weighing-machine, the combination of a plurality of weighing apparatuses comprising a plurality of coacting weighing mechanisms embodying a plurality of load-receivers and a plurality of beam mechanisms therefor; overload-supply means for said receivers; a plurality of stream-controlling means; a plurality of material-discharge means; a plurality of alternately-operable load-reducing instrumentalities, the load-reducing instrumentality of one apparatus being controlled by and on the operation of another of said apparatuses through the medium of the weighing mechanism thereof on its return to its normal position to receive a load after the discharge of its preceding load; a plurality of main locking means intermediate said stream-controlling means and load-discharge means, and operative to lock the stream-controllers shut when the load-discharge means are open and to lock the load-discharge means shut when the stream-controllers are open, and each of which locking means embodies supplemental locking means operative to maintain the load-discharge means shut on the unlocking of the main locking means; reciprocally-effective locking means intermediate the stream-controlling means, whereby, when one of said stream-controlling means is open the other is locked shut; and reciprocally-effective locking means intermediate the load-discharge means, whereby, when one of said load-discharge means is open the other will be prevented from opening should its supplemental locking means be prematurely tripped.

53. In a weighing-machine, the combination of a pair of weighing mechanisms, each embodying a load-receiver, and one of said weighing mechanisms having a load-reducer operative to discharge the surplus material of the load of one receiver into the load-receiver of the other weighing mechanism.

54. The combination in a weighing apparatus, of a pair of weighing mechanisms, each provided with a load-receiver and with means located and operating for reducing an overload to bring the weighing mechanism to a poise by discharging the surplus material from its load-receiver; and means for delivering the surplus of the load of one weighing mechanism into the load-receiver of the other weighing mechanism, whereby the discharged surplus of the load of one mechanism constitutes a part of the overload of the other mechanism.

55. The combination of a pair of weighing mechanisms, each embodying a load-receiver, and a load-reducer operative to reduce a load and to discharge the surplus material thereof into the other receiver, said reducers being disposed intermediate said weighing mechanisms.

56. In a weighing-machine, the combination of a pair of weighing mechanisms, each embodying a load-receiver, one of said weighing mechanisms having load-discharge means, and the other of said weighing mechanisms having load-reducing means; and actuator means for operating said load-reducing means on the operation of the other weighing mechanism, and controlled in its operation at one predetermined period by the load-discharge means of said weighing mechanism.

57. In a weighing-machine, the combination of a pair of weighing mechanisms; load-supply means for each of said weighing mechanisms, one of said weighing mechanisms having a stream-controller; and means for effecting the operation of said stream-controller at one predetermined period; and the other of said weighing mechanisms having a load-reducing instrumentality operative to reduce the load supplied thereto; and means intermediate the stream-controller-actuating means of one weighing mechanism and the load-reducing instrumentality of the other weighing mechanism for effecting the operation of said load-reducing instrumentality.

58. A weighing-machine comprising a pair of weighing mechanisms, each having a load-receiver, one of said weighing mechanisms having load-reducing means operative to reduce the load supplied to one receiver and to discharge the surplus material thereof into the other receiver intermediate its top and bottom; and means for supplying said other receiver with material at the upper part thereof, whereby said receiver is supplied with material from different sources.

59. A weighing-machine comprising a pair of weighing mechanisms, each having a load-receiver adapted to receive material at the top and also at the side thereof; means for reducing the load of each receiver, and operative to discharge the surplus thereof into the other receiver at the side thereof, and on the ascent of said receiver to receive a load; and means for supplying each of said receivers with material at the top thereof, whereby each receiver is supplied with material from different sources simultaneously during a predetermined period.

60. The combination of a pair of weighing mechanisms; load-supply means for each of said weighing mechanisms; a stream-controller for regulating the supply to each weighing mechanism; load-discharge means for each weighing mechanism; reciprocally-effective locking means intermediate the stream-controller and the load-discharge means of each weighing mechanism and operative to lock the stream-controller inoperative when the load-discharge means is in operation, and to lock said load-discharge means inoperative when the stream-controller is in operation; and reciprocally-effective means intermediate the stream-controllers of said weighing mechanisms and operative when one of said stream-controllers is in operation to lock the other inoperative.

61. The combination of a pair of weighing mechanisms; load-supply means for each of said weighing mechanisms; a stream-controller for regulating the supply to each weighing mechanism; load-discharge means for each weighing mechanism; reciprocally-effective locking means intermediate the stream-controller and the load-discharge means of each weighing mechanism and operative to lock the stream-controller inoperative when the load-discharge means is in operation, and to lock said load-discharge means inoperative when the stream-controller is in operation; and reciprocally-effective means intermediate said load-discharge means and operative on the operation of one load-discharge means to lock the other against operation.

62. The combination of a pair of weighing mechanisms; load-supply means for each of said weighing mechanisms; a stream-controller for regulating the supply to each weighing mechanism; load-discharge means for each weighing mechanism; reciprocally-effective locking means intermediate the stream-controller and the load-discharge means of each weighing mechanism and operative to lock the stream-controller shut when the load-discharge means is open, and to lock said load-discharge means shut when the stream-controller is open; reciprocally-effective means intermediate the stream-controllers of said weighing mechanisms and operative when one of said stream-controllers is open to lock the other against opening; and reciprocally-effective means intermediate said load-discharge means and operative on the opening of one load-discharge means to lock the other against opening.

FRANCIS H. RICHARDS.

Witnesses:
C. A. WEED,
EDWARD A. MEAD.